US008746746B1

(12) United States Patent
Schafer et al.

(10) Patent No.: US 8,746,746 B1
(45) Date of Patent: Jun. 10, 2014

(54) NESTABLE CONNECTOR

(71) Applicants: Christopher E. Schafer, Adair, IA (US);
Charlie J. Schafer, St. Petersburg, FL (US)

(72) Inventors: Christopher E. Schafer, Adair, IA (US);
Charlie J. Schafer, St. Petersburg, FL (US)

(73) Assignee: Charlie J. Schafer, St. Petersburg, FL (US)

( * ) Notice: Subject to any disclaimer, the term of this patent is extended or adjusted under 35 U.S.C. 154(b) by 0 days.

(21) Appl. No.: 13/781,106

(22) Filed: Feb. 28, 2013

(51) Int. Cl.
*F16L 39/00* (2006.01)
(52) U.S. Cl.
USPC .................................. 285/133.11; 285/133.3
(58) Field of Classification Search
USPC ......... 285/133.11, 133.21, 133.4–133.6, 419, 285/373, 921
See application file for complete search history.

(56) References Cited

U.S. PATENT DOCUMENTS

| | | | | |
|---|---|---|---|---|
| 2,908,744 | A * | 10/1959 | Bollmeier | 174/76 |
| 3,791,679 | A * | 2/1974 | Glover | 285/132.1 |
| 4,248,459 | A * | 2/1981 | Pate et al. | 285/319 |
| 4,797,512 | A * | 1/1989 | Kumagai et al. | 174/135 |
| 5,277,459 | A * | 1/1994 | Braun et al. | 285/419 |
| 6,619,697 | B2 * | 9/2003 | Griffioen et al. | 285/126.1 |
| 6,676,173 | B2 * | 1/2004 | Donnelly | 285/373 |
| 7,388,149 | B2 * | 6/2008 | Doherty et al. | 174/21 JS |
| 7,438,326 | B1 * | 10/2008 | Meyers | 285/133.11 |
| 7,709,736 | B2 * | 5/2010 | Irisawa | 174/71 R |
| 2006/0131872 | A1 * | 6/2006 | Roig | 285/133.5 |
| 2007/0102925 | A1 * | 5/2007 | Nishino | 285/133.3 |
| 2011/0068569 | A1 * | 3/2011 | Boettner | 285/133.21 |

* cited by examiner

*Primary Examiner* — Aaron Dunwoody
(74) *Attorney, Agent, or Firm* — G. Brian Pingel; Camille L. Urban; David M. Breiner

(57) ABSTRACT

Example embodiments are directed to a fitting configured to transition from an open configuration to a closed configuration. In example embodiments, the fitting may include a first member, a second member, a first gusset base extending from the first member, a second gusset base extending from the second member, and a hinge connecting the first member to the second member. In example embodiments, the first gusset base may include at least one first gusset and the second gusset base may include at least one second gusset. In example embodiments a distance between outermost portions of the at least one first and second gussets may be substantially the same as a distance separating the first member from the second member.

11 Claims, 8 Drawing Sheets

NESTABLE CONNECTOR

BACKGROUND

1. Field

Example embodiments relate to a fitting configured to transition from an open configuration to a closed configuration. In example embodiments, the fitting may include gussets which may aid in a stacking of a plurality of fittings.

2. Description of the Related Art

In the conventional art, fittings are used to connect different pipes and/or tubes together. For example, an "elbow" is a fitting installed between two pipes (or tubes) to allow a fluid to change direction. As another example, a "reducer" is used to connect a pipe or tube having a first inner diameter to a pipe or tube having a second inner diameter which is different from the first inner diameter. A "wye" fitting connects three different pipes to one another such that two of the pipes are in line with one another while the third pipe is angled at 45 degrees with respect to the first and second pipes. A "tee" fitting is a pipe fitting used to connect three pipes to one another wherein two of the pipes are in alignment with one another and the third pipe is perpendicular to the two aligned pipes.

FIGS. 1 and 2 illustrate a cross section view and a perspective view of a conventional tee fitting 50. As shown in FIGS. 1 and 2, the conventional tee fitting 50 is comprised of a first cylindrical member 10 and a second cylindrical member 20 which are oriented substantially perpendicular to one another. In the conventional tee fitting 50, each of the first cylindrical member 10 and the second cylindrical member 20 are hollow members with spaces in fluid communication with one another. Thus, fluid flowing through the first cylindrical member 10 may flow into the second cylindrical member 20.

As shown in FIG. 1, the conventional tee 50 may be used to connect a first pipe 2 to a second pipe 4 and a third pipe 6, wherein the second pipe 4 and the third pipe 6 are substantially aligned with one another. In the conventional art, a first fluid flow F1 flowing through the first pipe 2 may flow through a first aperture 15 of the tee 50 and into the first cylindrical member 10. Similarly, a second fluid flow F2 flowing through the second pipe 4 may flow through a second aperture 25 of the tee 50 and into the second cylindrical member 20. The first fluid flow F1 and the second fluid flow F2 may combine to form a third fluid flow F3 which may exit the tee 50 through a third aperture 30 to enter the third pipe 6.

In the conventional art, fittings such as elbows, reducers, wyes, and tees are often made from a casting process which results in a single unitary member. In other processes, the fittings are manufactured by modifying and welding together different cylindrical members. In either case, the fittings are generally transported from one location to another in their completed form.

SUMMARY

Applicants have noted for some time that shipping conventional fittings from one location to another is relatively inefficient due to the geometry of the completed forms and the fact that conventional fittings, such as tees, have no nesting ability. Applicants therefore have sought to design an innovative fitting which may be nestable with other fittings thereby promoting greater efficiency in storing and transporting multiple fittings. An example of a fitting is disclosed in the detailed description. The example fitting is configured to transition from an open configuration to a closed configuration. In example embodiments, the fitting may include gussets which may aid in a stacking of a plurality of fittings. In example embodiments the gussets may also increase crush resistance.

The fitting according to example embodiments may resemble a conventional tee that is cut in half wherein the halves are joined to one another via a hinge. Thus, the fitting according to example embodiments may assume various configurations including an open configuration which allows for a plurality of fittings to be "nested" for efficient transport and storage, and a closed configuration which allows fitting to be used in the field (for example to join several pipes together). In the closed position, the fitting according to example embodiments may resemble a conventional tee. In example embodiments, some versions of the fitting are provided with snap-type fasteners to enable a user in the field to easily manipulate the fitting into the closed position and lock the fitting in the closed position for use.

Example embodiments are directed to a fitting configured to transition from an open configuration to a closed configuration. In example embodiments, the fitting may include a first member, a second member, a first gusset base extending from the first member, a second gusset base extending from the second member, and a hinge connecting the first member to the second member. In example embodiments, the first gusset base may include at least one first gusset and the second gusset base may include at least one second gusset. In example embodiments a distance between outermost portions of the at least one first and second gussets may be substantially the same as a distance separating the first member from the second member.

BRIEF DESCRIPTION OF THE DRAWINGS

Example embodiments are described in detail below with reference to the attached drawing figures, wherein.

DETAILED DESCRIPTION

Figure 1:
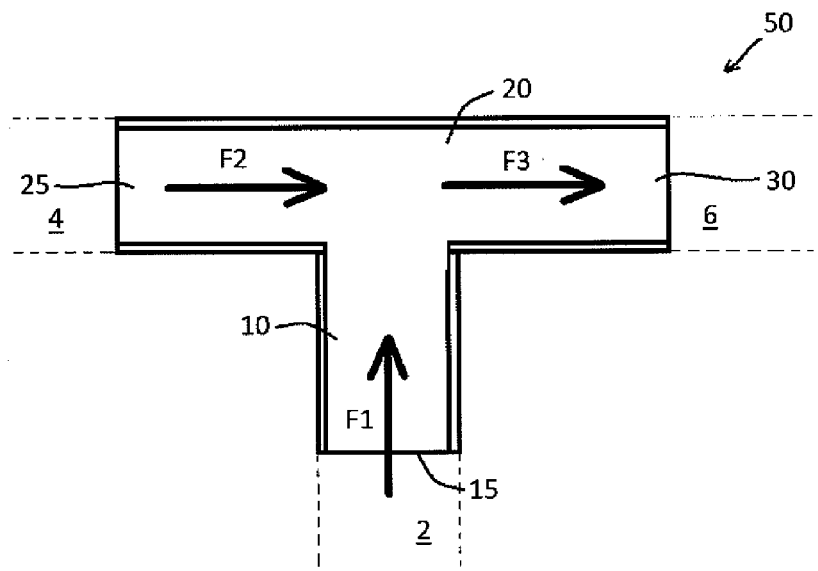
FIG. 1 is a view of a conventional tee fitting in accordance with example embodiments.
Figure 2:
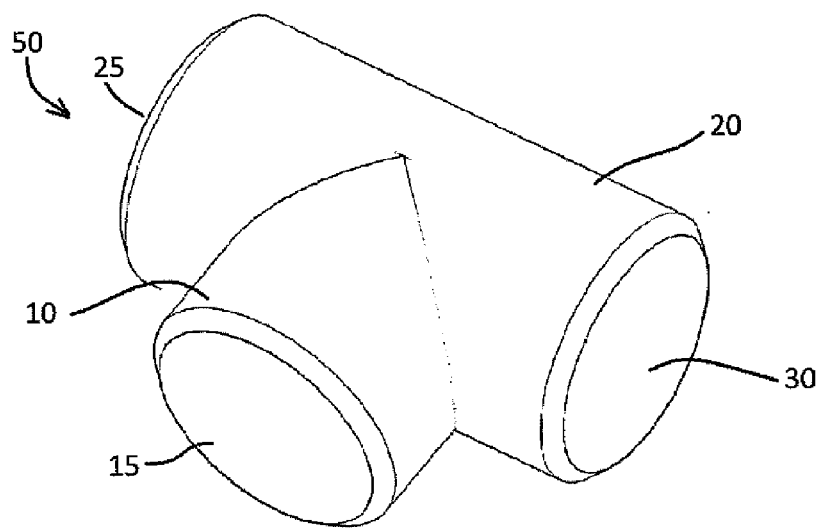
FIG. 2 is another view of a conventional tee fitting in accordance with example embodiments.

Example embodiments will now be described more fully with reference to the accompanying drawings. Example embodiments are not intended to limit the invention since the invention may be embodied in different forms. Rather, the example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly.

Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a fitting configured to transition from an open configuration to a closed configuration. In example embodiments, the fitting may include gussets which may aid in a stacking of a plurality of fittings.

Figure 3:
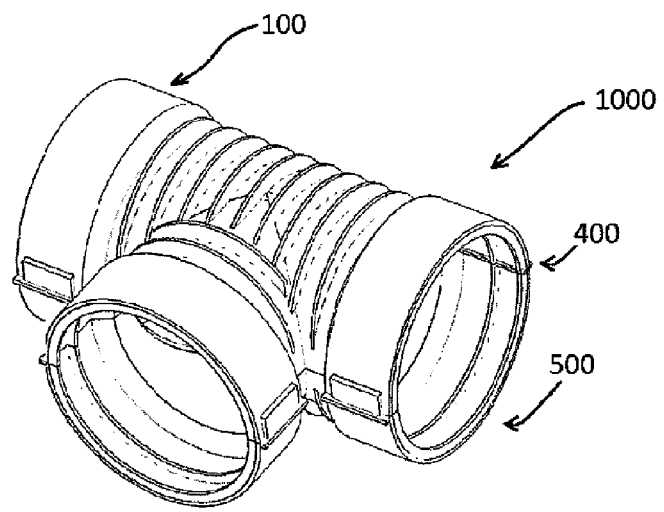
FIG. 3 is a view of a fitting in accordance with example embodiments.
Figure 4:
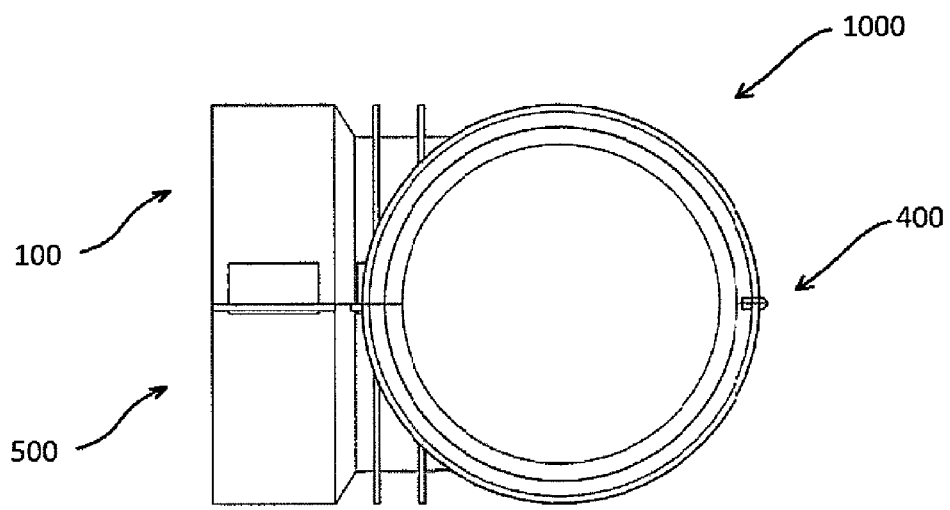
FIG. 4 is another view of the fitting in accordance with example embodiments.

FIG. 3 is an isometric view of a fitting 1000 in accordance with example embodiments. In example embodiments, the fitting 1000 is comprised of a first member 100 and a second member 500 that may be connected to one another by a hinge 400. In example embodiments, the first member 100 and the second member 500 may include fasteners to lock the first member 100 to the second member 500. When the fasteners are engaged, as shown in FIGS. 3 and 4, the fitting 1000 is ready for use. When the fasteners are not engaged, the first member 100 and the second member 500 may be free to revolve about the hinge 400. In example embodiments, when the fasteners are not engaged, the fitting 1000 may assume an open position where the first and second members 100 and 500 are substantially aligned with one another as shown in at least FIG. 5.

Figure 6:
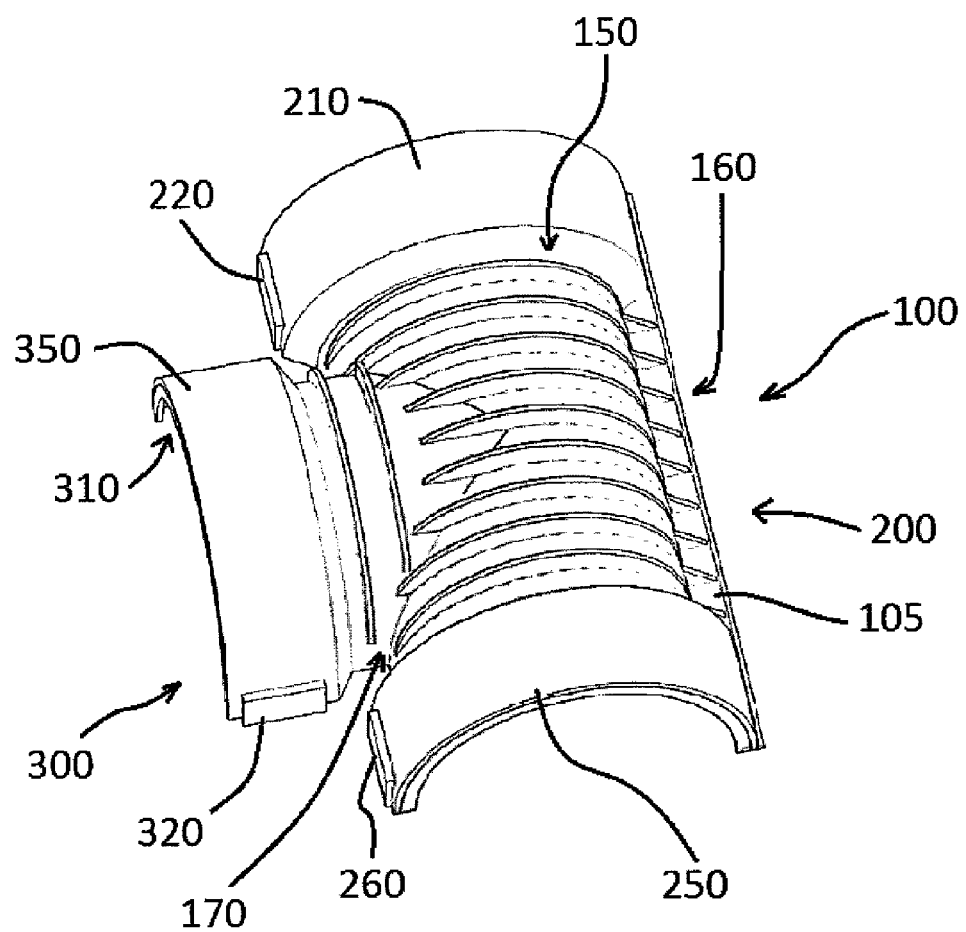
FIG. 6 is a view of a first member of the fitting in accordance with example embodiments.

FIG. 6 is a perspective view of the first member 100 in accordance with example embodiments. As shown in at least FIG. 6, the first member 100 may include a primary member 200 and a secondary member 300 extending from the primary member 200. In example embodiments, each of the primary member 200 and the secondary member 300 may resemble a shell type member. For example, each of the primary member 200 and the secondary member 300 may resemble an elongated member having arc-shaped cross section. For example, a cross section of the primary member 200 and/or the secondary member 300 may resemble, but is not limited to, a semicircle, a partial ellipse, and a partial parabola. Example embodiments, however, are not limited thereto as the cross section may also resemble another shape, such as, but not limited to, a polygon. In example embodiments, the primary member 200 and the secondary member 300 may resemble half of a conventional tee fitting. For example, each of the primary member 200 and the secondary member 300 may resemble a hollow cylinder cut in half lengthwise.

In example embodiments, ends of the primary member 200 and the secondary member 300 be configured for attachment to a pipe. For example, a first end of the primary member 200 may include a first flange 210, a second end of the primary member 200 may include a second flange 250, and an end of the secondary member 300 may include a third flange 350. In example embodiments, the first, second, and third flanges 210, 250, and 350 may be configured to allow pipes or tubes to attach to the fitting 1000.

In example embodiments, the first member 100 may include fasteners configured to attach the first member 100 to the second member 500. For example, as shown in at least FIG. 6, the first member 100 may include a first fastener 220, a second fastener 260, a third fastener 310, and a fourth fastener 320. In example embodiments, the first, second, third, and fourth fasteners 220, 260, 310, and 320 may engage structures that may be arranged on the second member 500. For example, the first, second, third, and fourth fasteners 220, 260, 310, and 320 may resemble protrusions configured to insert into slotted tabs that may be on the second member 500 (to be explained later).

Although example embodiments illustrate the first member 100 as including four fasteners configured to interface with four structures on the second member 500, example embodiments are not limited thereto. For example, the first member 100 may alternatively have less than four fasteners or more than four fasteners. Furthermore, the fasteners may be omitted entirely as the first and second members 100 and 500 may be secured to one another via straps or another type of fastening device. Furthermore, the arrangement of the fasteners illustrated in the figures is for exemplary purposes only and is not intended to limit the invention since the fasteners may be arranged in various configurations and locations.

In example embodiments, the first member 100 may further include a plurality of stiffeners. For example, the first member 100 may include a first plurality of stiffeners 150 substantially or completely arranged on the primary member 200 and a second plurality of stiffeners 170 substantially or completely arranged on the secondary member 300. In example embodiments, the first plurality of stiffeners 150 may be substantially crescent shaped stiffeners as shown in the figures but may alternatively have another shape such as a trapezoidal, a circular, or an irregular shape. Similarly, the second plurality of stiffeners 170 may also resemble crescent shaped stiffeners but may alternatively have another shape such as a trapezoidal, circular, or an irregular shape. In the figures the first plurality of stiffeners 150 is illustrated as being comprised of nine (9) stiffeners, however, example embodiments are not limited thereto as the first plurality of stiffeners 150 may have more or less than nine (9) stiffeners.

In addition, in lieu of having a first plurality of stiffeners 150 on the primary member 200, only a single stiffener may be provided on the primary member 200. Similarly, although the second plurality of stiffeners 170 is illustrated as being comprised of two stiffeners, more than two stiffeners may be provided. Also, instead of providing a plurality of stiffeners on the secondary member 300, only a single stiffener may be provided.

Figure 7:
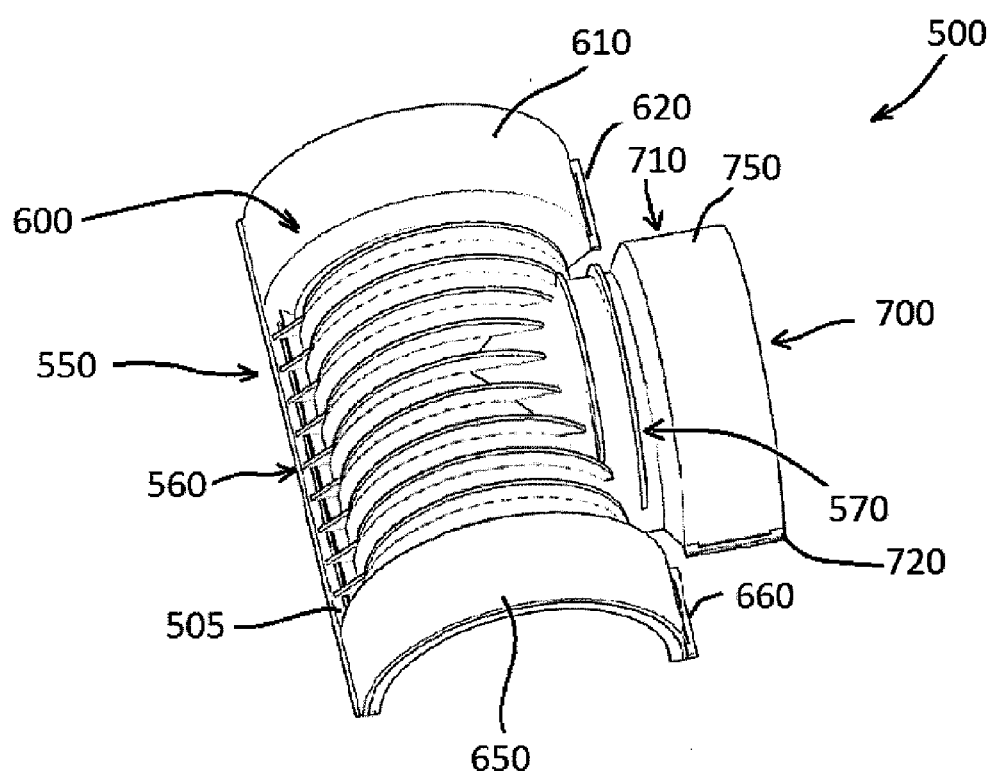
FIG. 7 is a view of a second member of the fitting in accordance with example embodiments.

FIG. 7 is a perspective view of the second member 500 in accordance with example embodiments. In example embodiments, the second member 500 may be substantially identical to the first member 100. For example, as shown in at least FIG. 7, the second member 500 may also include a primary member 600 and a secondary member 700 extending from the primary member 600. In example embodiments, each of the primary member 600 and the secondary member 700 may resemble a shell type member. For example, each of the primary member 600 and the secondary member 700 may resemble an elongated member having arc-shaped cross section. For example, a cross section of the primary member 600 and/or the secondary member 700 may resemble, but is not limited to, a semicircle, a partial ellipse, and a partial parabola. Example embodiments, however, are not limited thereto as the cross section may also resemble another shape, such as, but not limited to, a polygon. In example embodiments, the primary member 600 and the secondary member 700 may resemble half of a conventional tee fitting. For example, each of the primary member 600 and the secondary member 700 may resemble a hollow cylinder cut in half lengthwise.

In example embodiments, ends of the primary member 600 and the secondary member 700 may be configured for attachment to a pipe. For example, a first end of the primary member 600 may include a fourth flange 610, a second end of the primary member 600 may include a fifth flange 650, and an end of the secondary member 700 may include a sixth flange 750. In example embodiments, the fourth, fifth, and sixth flanges 610, 650, and 750 may be configured to allow pipes or tubes to attach to the fitting 1000.

Figure 5:
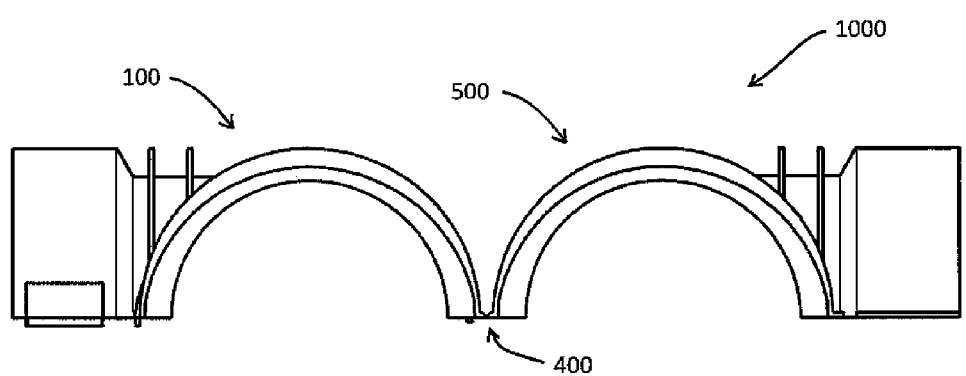
FIG. 5 is a view of the fitting in accordance with example embodiments, wherein the fitting in an "open" position.

In example embodiments, the second member 500 may include fastening structures configured to interface with the fasteners of the first member 100. For example, as shown in at least FIG. 7, the second member 500 may include a first slotted tab 620, a second slotted tab 660, a third slotted tab 710, and a fourth slotted tab 720 (each of which are examples of a fastening structure). In example embodiments, the first, second, third, and fourth slotted tabs 620, 660, 710, and 720 may be rectangular tabs that protrude from the second member 500 and are arranged to correspond with the first, second, third, and fourth fasteners 220, 260, 310, and 320 so that as the fastener 1000 is manipulated into a closed position (as shown in FIG. 4) from an open position (as shown in FIG. 5) the protrusions of the first, second, third, and fourth fasteners 220, 260, 310, and 320 extend into slots provided in the first, second, third, and fourth slotted tabs 620, 660, 710, and 720.

Although example embodiments illustrate the second member 500 as including four fastening structures to interface with four fasteners on the first member 100, example embodiments are not limited thereto. For example, the second member 500 may alternatively have less than four fastening structures or more than four fastening structures. Furthermore, the fastening structures may be omitted entirely as the first and second members 100 and 500 may be secured to one another via straps or another type of fastening device. Furthermore, the arrangement of the fastening structures illustrated in the figures is for exemplary purposes only and is not intended to limit the invention since the fastening structures may be arranged in various configurations and locations.

In example embodiments, the second member 500 may further include a plurality of stiffeners. For example, the second member 500 may include a third plurality of stiffeners 550 substantially or completely arranged on the primary member 600 and a fourth plurality of stiffeners 570 substantially or completely arranged on the secondary member 700. In example embodiments, the third plurality of stiffeners 550 may be substantially crescent shaped stiffeners as shown in the figures but may alternatively have another shape such as a trapezoidal, a circular, or an irregular shape. Similarly, the fourth plurality of stiffeners 570 may also resemble crescent shaped stiffeners but may alternatively have another shape such as a trapezoidal, circular, or an irregular shape. In the figures the third plurality of stiffeners 550 is illustrated as being comprised of nine (9) stiffeners, however, example embodiments are not limited thereto as the third plurality of stiffeners 550 may have more or less than nine (9) stiffeners. In addition, in lieu of having a third plurality of stiffeners 550 on the primary member 600, only a single stiffener may be provided on the primary member 600. Similarly, although the fourth plurality of stiffeners 570 is illustrated as being comprised of two stiffeners, more than two stiffeners may be provided. Also, instead of providing a plurality of stiffeners on the secondary member 700, only a single stiffener may be provided.

Figure 8:
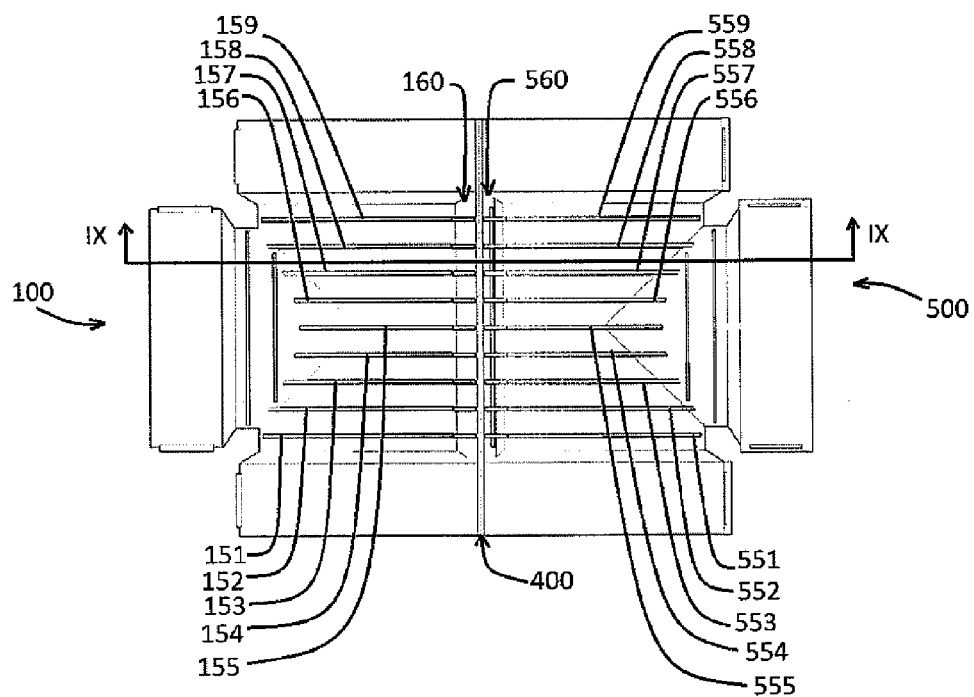
FIG. 8 is a top view of the fitting in accordance with example embodiments, wherein the fitting is in an open position.
Figure 9:
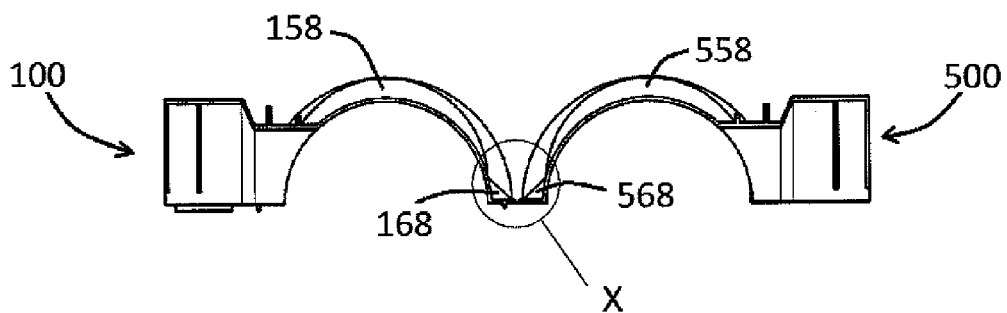
FIG. 9 is a section view of the fitting in accordance with example embodiments.

FIG. 8 is a top view of the fitting 1000 in accordance with example embodiments and FIG. 9 is a cross section view of the fitting 1000 taken through line IX-IX. In FIG. 8, each of the stiffeners of the first plurality of stiffeners 150 is identified. For example, as is clearly illustrated in FIG. 8, the first plurality of stiffeners 150 may include a first stiffener 151, a second stiffener 152, a third stiffener 153, a fourth stiffener 154, a fifth stiffener 155, a sixth stiffener 156, a seventh stiffener 157, an eighth stiffener 158, and a ninth stiffener 159. Similarly, the third plurality of stiffeners 550 is clearly illustrated as having a first stiffener 551, a second stiffener 552, a third stiffener 553, a fourth stiffener 554, a fifth stiffener 555, a sixth stiffener 556, a seventh stiffener 557, an eighth stiffener 558, and a ninth stiffener 559. Also shown in FIG. 8 is a first plurality of gussets 160 and a second plurality of gussets 560 arranged near the hinge 400 and at the ends of the first plurality of stiffeners 150 and the third plurality of stiffeners 550. Though not labeled on FIG. 8, the first plurality of gussets 160 may include nine (9) gussets that correspond to the nine stiffeners of the first plurality of stiffeners 150. Similarly, the second plurality of gussets 560 may include nine (9) gussets that correspond to the nine stiffeners of the third plurality of stiffeners 550. In example embodiments, each of the first plurality of gussets 160 and the second plurality of gussets 560 are illustrated as including nine (9) gussets, however, example embodiments are not limited thereto as there may be more or less than nine gussets in each of the first and second pluralities of gussets 160 and 560.

Referring to FIG. 9, it is observed that each of the eighth stiffeners 158 and 558 of the first and third pluralities of stiffeners 150 and 550 may be crescent shaped stiffeners with ends near eighth gusset plates 168 and 568 of the first plurality of gusset plates 160 and the second plurality of gusset plates 560. In example embodiments, each of the nine stiffeners of the first plurality of stiffeners 150 may resemble the eighth stiffener 158 and each of the nine stiffeners of the third plurality of stiffeners 550 may resemble the eighth stiffener 558. In this respect, the eighth stiffeners 158 and 558 may be considered representative stiffeners of the first plurality of stiffeners 150 and the third plurality of stiffeners 550. Similarly, each of the nine gussets of the first plurality of gussets 160 may resemble the eighth gusset 168 and each of the nine gussets of the second plurality of gussets 560 may resemble the eighth gusset 568. In this respect, the eighth gussets 168 and 568 may be considered representative stiffeners of the first plurality of gussets 160 and the second plurality of gussets 560.

In example embodiments, the first plurality of gussets 160 may be on a first gusset base 105 which may resemble a rectangular tab protruding from the primary member 200 of the first member 100. Similarly, the second plurality of gussets 560 may be on a second gusset base 505 that may resemble a rectangular tab protruding from the primary member 600 of the second member 500. In example embodiments, the first and second gusset bases 105 and 505 may join with one another to form the hinge 400 or a least may join together to form part of the hinge 400. In some embodiments one of the first and second gusset bases 105 and 505 may include an aperture 590 or a plurality of apertures while the other of the first and second gusset bases 105 and 505 may include a protrusion 190 or a plurality of protrusions that may protrude into the aperture 590. Thus, when the fitting 1000 is manipulated into the closed position, the protrusion 190 may be inserted into the aperture 590. Thus, the protrusion 190 and the aperture may be configured to act as an extra fastener in the fitting 1000.

Figure 10:
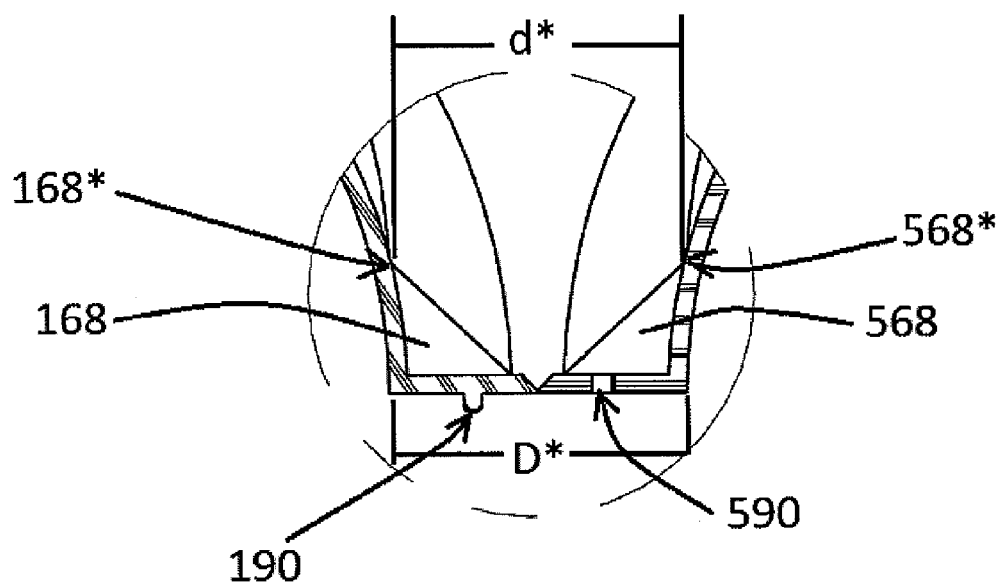
FIG. 10 is a closeup view of the fitting in accordance with example embodiments.
Figure 11A:
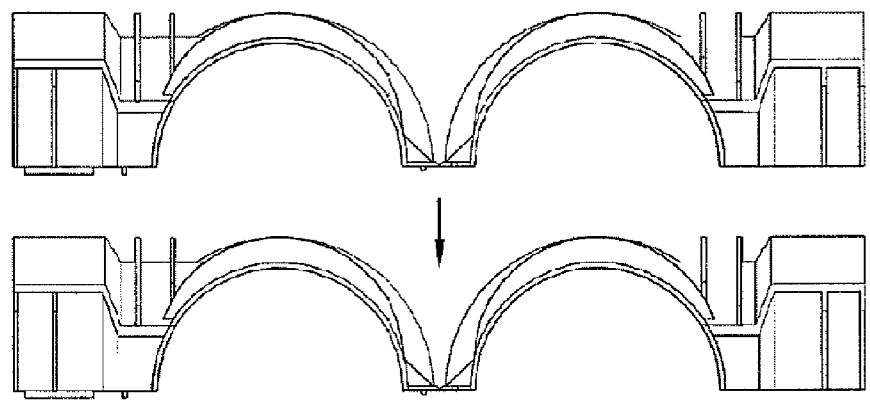
FIGS. 11A-11C are views illustrating a stacking of multiple fittings in accordance with example embodiments.
Figure 11B:
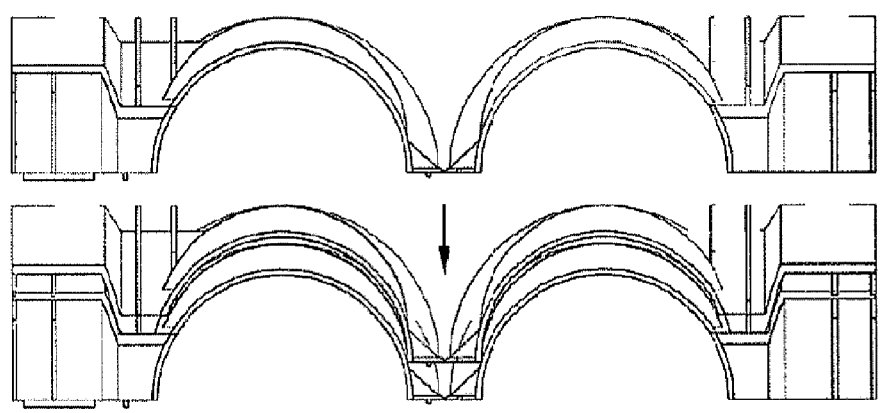
Figure 11C:
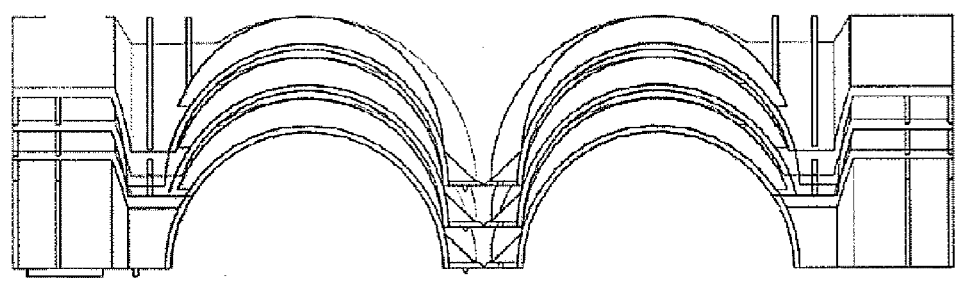

Referring to FIG. 10, it is observed that the eighth gussets 168 and 568 may resemble substantially triangular shaped members having an upper corner arranged near lower edge of the eighth stiffeners 158 and 558. The triangular shape is meant for purposes of illustration only and is not intended to limit example embodiments. For example, the eighth gussets 168 and 568 may have another shape, for example, a square, rectangular, or arc shape. For example, the eighth gussets 168 and 568 may resemble a quarter circle. In example embodiments, when the fitting 1000 is in the open position, the distance d* separating the outermost portions 168* and 568* of the eighth gussets 168 and 568 may be substantially the same as the distance separating inner walls of the first member 100 and the second member D*. This geometry allows for efficient stacking of more than one fitting 100. For example, as shown in FIGS. 11A, 11B, and 11C, separate fittings may be stacked on one another in an efficient manner which conserves space, wherein FIGS. 11A, 11B, and 11C represents cross-sections of various fittings being stacked on one another.

The fitting 1000 according to example embodiments has several advantages over the prior art. One advantage is that several fittings 1000 may be nested thus allowing for an efficient use of space when compared to the conventional fittings. Although the fitting 1000 according to example embodiments is directed to a tee type fitting, the inventive concepts may be applied to other types of fittings such as reducers, wyes, and elbows amongst other structures.

In practice, a plurality of fittings 1000 may be transferred from one location to another in a stacked configuration. When a user wishes to install a fitting 1000 in the field, the user may simply remove one of the fittings 1000 from the stack and manipulate the fitting by revolving one (or both) of the first member 100 and the second member 500 about the hinge 400 until the fasteners on the first member 100 are engaged with the fastening structures on the second member. For example, the fasteners on the first member 100 and the fastening structures on the second member 500 may be configured as a snap-shut type fastening device as is well known in the art. Thus, the fitting 1000 in accordance with example embodiments may be easily implemented in the field.

In the closed position, the first flange 210 and the fourth flange 610 may combine to form a flange into which a pipe or a tube may be inserted. Similarly, the second flange 250 and the fifth flange 650 may combine to form a flange into which another pipe or tube may be inserted. Also, the third flange 350 and the sixth flange 750 may combine to form another flange into which another pipe or tube may be inserted. For example, in the event the first flange 210 and the fourth flange 610 are used to connect a circular pipe or tube to the fitting 1000, the first flange 210 and the fourth flange 610 may be configured with half circular openings having a same inner diameter so that in the closed position, the first flange 210 and the fourth flange 610 form a flange with a circular opening configured to accommodate the pipe. Of course, the same is applicable to the flanges formed by the second and fifth flanges 250 and 650 and the third and sixth flanges 350 and 750. Example embodiments, however, are not limited thereto since each of the flanges 210, 250, 350, 610, 650, and 750, or some of the flanges 210, 250, 350, 610, 650, and 750 may be omitted. For example, rather than providing flanges at ends of the primary members 200 and 600 and secondary members 300 and 700, the ends may be threaded to engage internal threads of a threaded pipe. In the alternative, ends of the primary members 200 and 600 and secondary members 300 and 700 may not have threads. Thus, each of the primary members 200 and 600 and secondary members 300 and 700 may simply resemble a half hollow cylinder.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A fitting configured to transition from an open configuration to a closed configuration, the fitting being comprised of:
    a first member including a first plurality of crescent shaped stiffeners;
    a second member including a second plurality of crescent shaped stiffeners;
    a hinge connecting the first and second members;
    a first gusset base extending from the first member; and
    a second gusset base extending from the second member, wherein the first gusset base has at least one first gusset and the second gusset base includes at least one second gusset and, in the open configuration, a distance between outermost portions of the at least one first and second gussets is substantially the same as or larger than a distance separating inner surfaces of the first member and the second member.

2. The fitting according to claim 1, wherein the at least one first gusset is a plurality of first gussets and the at least one second gusset is a plurality of second gussets.

3. The fitting according to claim 1, wherein the first plurality of stiffeners and the plurality of first gussets are substantially aligned with one another and the second plurality of stiffeners and the plurality of second gussets are substantially aligned with one another.

4. The fitting according to claim 1, wherein one of the first gusset base and the second gusset base includes an aperture and the other of the first gusset base and the second gusset base has a protrusion which is inserted into the aperture when the fitting is in the closed configuration.

5. The fitting according to claim 1,
wherein at least one of the stiffeners of the first plurality of stiffeners is aligned with the at least one first gusset and at least one of the stiffeners of the second plurality of stiffeners is aligned with at the at least one second gusset.

6. The fitting according to claim 5, wherein, in the closed position, the fitting resembles a Tee.

7. The fitting according to claim 5, further comprising:
fasteners on the first member configured to engage fastening structures on the second member.

8. The fitting according to claim 5, wherein the stiffeners of the first plurality of stiffeners are equally spaced on the first member and the stiffeners of the second plurality of stiffeners are equally spaced on the second member.

9. A fitting configured to transition from an open configuration to a closed configuration, the fitting being comprised of:
a first member having a first plurality of crescent shaped stiffeners; and
a second member having a second plurality of crescent shaped stiffeners;
a hinge connecting the first and second members;
a first gusset base extending from the first member;
a second gusset base extending from the second member;
a first gusset extending from the first member to the first gusset base; and
a second gusset extending from the second member to the second gusset base.

10. The fitting according to claim 9,
wherein a distance between outermost portions of the at least one first and second gussets is substantially the same as or larger than a distance separating inner surfaces of the first member and the second member.

11. The fitting according to claim 10, wherein the at least one first gusset is a plurality of gussets substantially aligned with the first plurality of stiffeners and the at least one second gusset is a plurality of stiffeners aligned with the second plurality of stiffeners.

* * * * *